Figure 1:
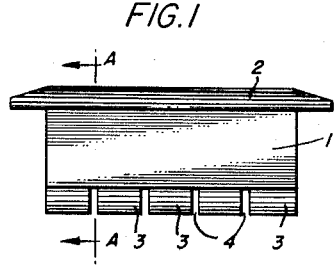

Nov. 24, 1964        K. ABEGG        3,158,771

FIELD SPIDER AND POLE PIECE FOR ELECTRICAL MACHINES

Filed Nov. 29, 1960

INVENTOR:
KARL ABEGG

BY *Frederick Breitenfeld*

ATTORNEY united States Patent Office 3,158,771
Patented Nov. 24, 1964

3,158,771
FIELD SPIDER AND POLE PIECE FOR
ELECTRICAL MACHINES
Karl Abegg, Zurich, Switzerland, assignor to Oerlikon
Engineering Company, Zurich, Switzerland, a corporation of Switzerland
Filed Nov. 29, 1960, Ser. No. 87,730
Claims priority, application Switzerland, Dec. 8, 1959,
81,609/59
2 Claims. (Cl. 310—218)

My present invention relates to improvement in electrical machines in which a revolving field member comprises a field spider and pole pieces secured to it. An object of my improvement is to render said spider and pole pieces mechanically safer without adding weight, even by decreasing same.

Highly-stressed steel constructions often are dangerously susceptible to brittleness failure in the vicinity of notches, slots or grooves. In slotted or notched solid bodies high local stresses often cause brittleness breaks, ruptures or failures owing to uncontrollable deflects, flaws or faults in the material, and such breaks tend to spread instantly.

This is the case, for example, in rotor bodies or field spiders of high-speed acyclic or homopolar generators, which comprise individual disks or rings to which the pole pieces are fixed by means of dovetail tenons and grooves. An avoidance of such a disadvantage is possible by fabricating such bodies of a plurality of separate parts so that propagation of cracks due to brittleness failure will be limited by the dimensions of the parts. The use of one-piece field spiders made of a single piece of steel is desirable, up to the largest dimensions feasible, since machining time can thereby be substantially reduced in comparison with a composite design. This advantage, however, is counteracted by the propagation risk of cracks due to brittleness failure.

My present invention aims to eliminate this deficiency by subdividing the highly stressed zones in the material by cross-cuts transverse to the spider axis. The advantage of my invention resides in the fact that one-piece field spiders may be used which require relatively little machining time, yet the risk of propagating brittleness breaks is reduced to a point no greater than that of composite constructions.

One form of the invention is shown in the drawing, in which—

Figure 2:
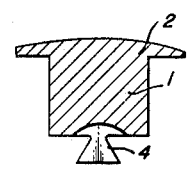
Figure 3:
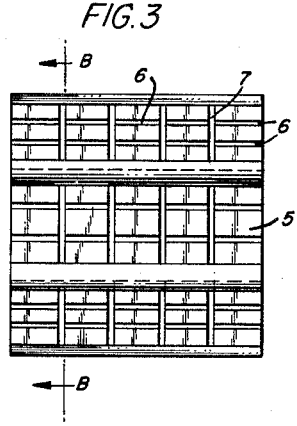
Figure 4:
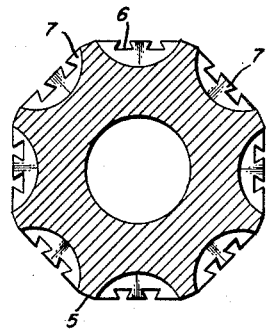
Figure 5:
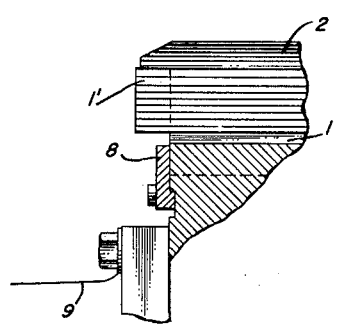

FIG. 1 shows a one-piece pole member;
FIG. 2 is a cross-section of the line A—A of FIG. 1;
FIG. 3 is a longitudinal view of the rotor body or field spider to which the pole pieces are dovetailed;
FIG. 4 is a cross-section on the line B—B of FIG. 3; and
FIGS. 5 and 6 each show a rim portion of the field-spider assembly.

In FIG. 1, numeral 1 designates the pole core which carries the field winding or coil; 2 is the pole shoe, and 3 is the dovetail tenon which, in accordance with my invention, is provided with cross-cuts or transverse slots 4.

In FIG. 3 is shown the field spider 5 with dovetail grooves 6 on its rim, and cross-cuts or transverse slots 7 in accordance with my invention. The slots 7 transversely intersect the grooves 6 and the lands flanking each groove, and the slots of each series are spaced apart to thereby divide each of the lands into a plurality of separate lands. The slots extend below the depth of their respective grooves as shown in FIG. 4. Similarly, the slots 4 are spaced apart along the length of each tenon 3 to thereby divide the tenon into a plurality of individual tenon, and the slots in each pole piece extend into the body of the pole piece past the point where the tenon meets the body, as shown in FIG. 2.

Figure 6:
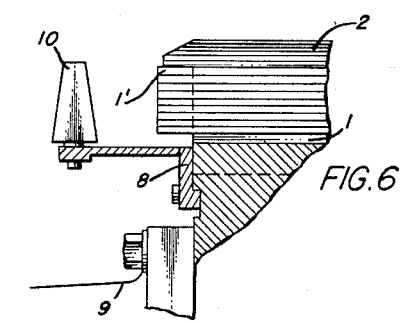

In FIGS. 5 and 6, numeral 1 again denotes the pole core which carries the field coil 1', and 2 again is the pole shoe. An end-ring 8 is fixed to either side of the field-spider rim, defining plates which cover each end of each dovetail groove. The field spider 5 is flanged and bolted to the stub shaft 9. As shown in FIG. 6, air or vanes or ventilating blades 10 are secured to end-ring 8.

The cross-cuts or slots in the endangered zone are so arranged that in the case of failure of a section owing to uncontrollable deflects in the material, the remaining sections nevertheless remain intact and thus are capable of taking up the increased stress. Any broken portion must remain locally fixed in order to prevent further damage as by flying off. Such objects may be attained, for example, by means of end-rings fixed to both side of the rotor body or field spider, as described in connection with FIGS. 5 and 6.

What I claim as new and desire to secure by Letters Patent, is:

1. In an electrical machine having a revolving field member comprising a field spider and pole pieces secured to said spider:
said spider being a one-piece element and each of said pole pieces being a one-piece element,
said spider being provided around it periphery with dovetail grooves and each of said pole pieces being provided along its inner side with a dovetail tenon for cooperation with one of said dovetail grooves,
the lands flanking each of said dovetail grooves in said spider having a series of peripheral slots transversely intersecting said groove, the slots of each series being spaced apart to thereby divide each of said lands into a plurality of separate lands,
the slots in said lands extending below the depth of their respective grooves,
the tenon of each of said pole pieces having a series of transverse slots spaced apart along the length of said tenon to thereby divide said tenon into a plurality of individual tenons,
the slots in each of said pole pieces extending into the body of said pole piece past the point where the tenon meets the body of said pole piece, and
a plate covering each end of each of said dovetail grooves, said plates being secured to the ends of said spider.

2. In an electrical machine, the elements defined in claim 1 including a ventilating blade secured to each of said plates.

References Cited by the Examiner
UNITED STATES PATENTS

| 1,355,347 | 10/20 | Mortensen | 310—218 |
| 2,769,104 | 10/56 | Hirsch | 310—269 XR |
| 2,792,511 | 5/57 | Horstman | 310—218 XR |
| 2,812,460 | 11/57 | Meyer | 310—218 |

FOREIGN PATENTS

| 13,864 | 1904 | Great Britain. |
| 18,532 | 1906 | Great Britain. |
| 3,627 | 1913 | Great Britain. |

MILTON O. HIRSHFIELD, *Primary Examiner.*